Patented Dec. 21, 1926.

1,611,540

UNITED STATES PATENT OFFICE.

RALPH D. McALLISTER, OF SALISBURY, MARYLAND, ASSIGNOR TO EDWARD E. TULL, OF PRINCESS ANNE, MARYLAND.

AGRICULTURAL TRACTOR GUIDE.

Application filed December 24, 1925. Serial No. 77,561.

The invention relates to automatic steering means for tractors employed in connection with agricultural machinery, whereby a plow, or other implement, after being properly started will continue to operate without being manned and, in the event of the implement getting off its course, it will automatically stop by the grounding, or otherwise interruption of the controlling circuit of the tractor.

The invention provides a steering guide mechanism which may be readily applied to any type of tractor, and which is controlled by the furrow formed by the shovel of the implement hitched to the tractor to be propelled thereby, the guide mechanism embodying a pilot wheel to run in the furrow and yieldably held therein both by a vertical and a lateral pressure.

While the drawings illustrate a preferred embodiment of the invention, it is to be understood that in adapting the means to meet specific needs and requirements the design may be varied, and such other changes in the minor details of construction may resorted to within the scope of the invention, as claimed, without departing from the spirit thereof.

For a full understanding of the invention and the merits thereof, reference is to be had to the following description and the drawings hereto attached, in which,—

Figure 1:
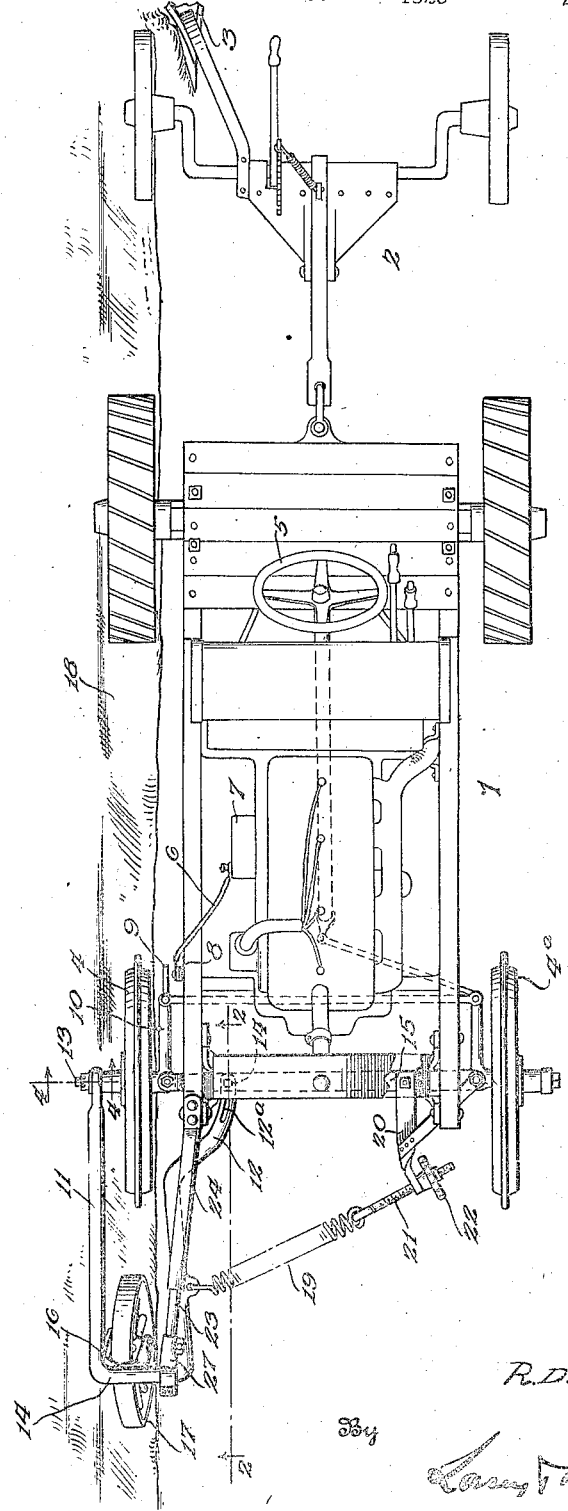
Figure 2:
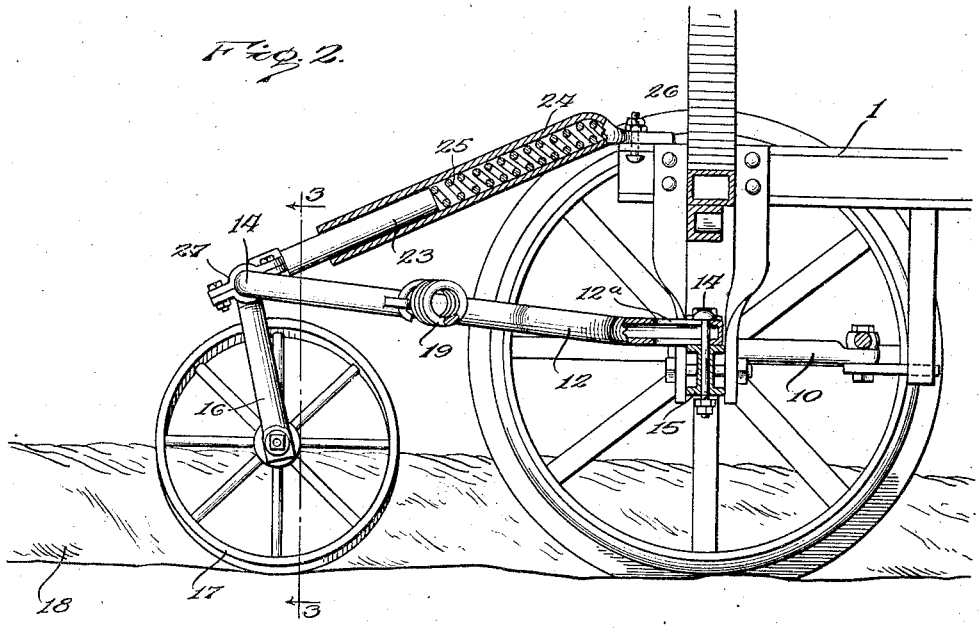
Figure 3:
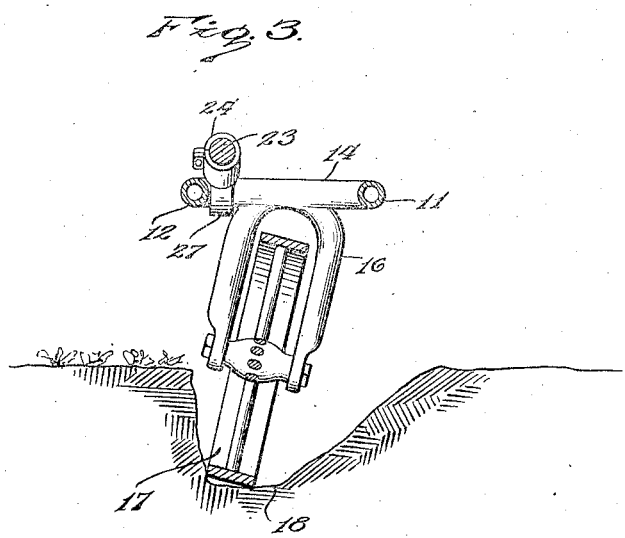
Figure 4:
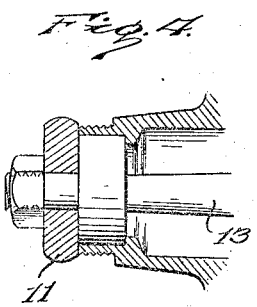

Figure 1 is a top plan view of a conventional type of tractor and agricultural implement hitched thereto, provided with an automatic guiding mechanism embodying the invention, Figure 2 is an enlarged sectional view about on the line 2—2 of Figure 1, looking in the direction of the arrows, the tubular member of the downwardly exerting pressure means being in section, Figure 3 is a vertical sectional view on the line 3—3 of Figure 2 looking in the direction of the arrows, and Figure 4 is a fragmentary sectional view on the line 4—4 of Figure 1, showing the parts on a larger scale.

Corresponding and like parts are referred to in the following description and designated in the several views of the drawings by like reference characters.

The numeral 1 designates a tractor which may be of any make and is illustrated to demonstrate the application of the invention. The numeral 2 designates an agricultural implement which is hitched to the tractor to be drawn over the field thereby. The implement 2 is provided with a furrow forming shovel 3, which may be of any design or type. The tractor is provided with steering wheels 4 and 4ª which are connected in any usual or preferred way, so as to be operated by the usual hand wheel 5 when it is required to steer the tractor by hand. The numeral 6 designates a conductor which leads from the magneto 7, or other source of current supply for the ignition system of the tractor power unit. The conductor 6 is electrically connected with a fixed contact 8 mounted upon the frame of the tractor and electrically insulated therefrom. A movable contact 9 is connected with the steering mechanism and, as shown, is attached to the steering arm 10 upon the furrow side of the tractor, so that in the event of the pilot wheel of the guiding mechanism leaving the furrow, the magneto will be grounded, or the supply of current to the ignition system will be interrupted, thereby causing the tractor to stop and preventing it from running wild.

The guiding mechanism comprises a frame which is connected to the tractor to have a limited vertical and lateral movement and this frame is narrow and elongated and comprises an outer member 11, an inner member 12 and a front cross bar 14. The rear end of the outer member 11 is connected to the outer end of the spindle 13 at the furrow side of the tractor. The rear portion of the inner member 12 is offset laterally and formed with a slot 12ª to receive a bolt or like fastening 14 which is mounted in the front axle 15 of the tractor whereby provision is had for a limited pivotal movement of the guiding frame which is essential to the proper operation of the mechanism as a whole. The outer or forward end of the guiding frame has a limited vertical movement and is supplied with a fork 16 in which is mounted a pilot wheel 17 which is adapted to run in the guiding furrow 18. A contractile spring 19 is attached at one end to the forward portion of the guiding frame and its opposite end is connected to the tractor and, as shown, a bracket 20 projects forwardly from the landside of the tractor and receives a screw 21 to which the inner end of the spring 19 is attached. A hand nut 22 is mounted upon the screw 21 and cooperates with the bracket 20 to properly tension the spring, whereby the front end of the guiding frame is normally drawn inwardly to keep the pilot wheel 17 in contact with the landside of the furrow 18.

A yieldable connection is interposed between the outer, or forward, end of the guiding frame and the tractor and exerts a downward pressure to hold the pilot wheel 17 within the furrow 18. This yieldable connection comprises sections 23 and 24 disposed to have a telescopic connection and an interposed helical spring 25 which is housed within the tubular section 24 and confined between the rear ends of the telescoping sections. The tubular section 24 is connected to the front portion of the tractor 1 in a manner to admit of the forward end of the section having a limited vertical and lateral play to conform to corresponding movements of the front end of the guiding frame. The lower, forward end of the section 23 is loosely clamped to the front cross bar 14 of the guiding frame, as indicated at 27. In the practical operation of the invention, the plow 2, or other agricultural implement to be drawn over the field, is hitched in any determinate way to the tractor 1 and the latter is equipped at its front end with the automatic steering means. It is essential that a furrow be provided about the field to be plowed, or otherwise prepared, and this initial furrow may be prepared in any preferred way, either by means of an ordinary plow, or by the use of the tractor which is operated by an attendant, the end portion of this initial, or circumscribing furrow terminating from the beginning of the furrow, a distance corresponding with the space desired between the furrows, the end portion of such initial furrow being extended a short distance parallel with the beginning of the initial furrow and spaced therefrom the required distance, after which, the mechanism is adjusted so that the pilot wheel 17 and the wheels of the tractor and implement 2, on the furrow side, enter the initial portion of the prepared furrow. The mechanism being thus adjusted, the motor of the tractor is started and the operation becomes automatic since the tractor is steered by the pilot wheel 17 running in the furrow 18. The landside of the furrow 18 is steep, as shown most clearly in Figure 3, and the spring 19 operates to hold the pilot wheel 17 against the landside of the furrow and should the pilot wheel from any cause, leave the furrow, which must be by way of the outer or side portion of the field, the front end of the steering frame will move outwardly, thereby bringing the contact 9 in engagement with the contact 8, thereby grounding the magneto, or otherwise interrupting the circuit upon which the motor of the tractor depends for its operation and in consequence, the tractor is brought to a standstill. When the mechanism is functioning properly it circles the field and works from the outer margin thereof towards the center in a continuous spiral path, as will be readily appreciated.

Having thus described the invention, I claim:

1. An automatic steering mechanism for a tractor, the same consisting of an elongated guiding frame connected to the outer end of the spindle on the furrow side of the tractor and having a loose connection with the frame of the tractor, a pilot wheel at the outer, or forward, end of the guiding frame, yieldable means between the guiding frame and the tractor, tending to move the forward end of the guiding frame landward and a yieldable connection between the tractor and the forward end of said guiding frame to normally exert a downward pressure thereon to hold the pilot wheel within the guiding furrow.

2. A guiding device for automatically steering a tractor the same comprising a substantially U-shaped frame, having its outer member connected to the outer end of the tractor spindle, upon the furrow side and having its inner member loosely connected with the tractor, a pilot wheel at the outer or forward end of the guiding frame, a yieldable connection between the guiding frame and tractor normally tending to move the front end of the guiding frame landward and a yieldable connection between the guiding frame and tractor normally exerting a downward pressure upon the front end of the guiding frame to hold the pilot wheel in a guiding furrow.

3. The combination with a tractor, of a guiding frame of substantially U-form having its outer member connected to the outer end of the spindle on the furrow side of the tractor, and having the rear portion of the inner member laterally offset and longitudinally slotted, fastening means connecting the slotted member to the tractor, a pilot wheel at the front end of the guiding frame, a spring between the tractor and guiding frame tending to move the latter inwardly at its forward end and a yieldable telescopic connection between the guiding frame and tractor normally tending to press the front end of the guiding frame downwardly and hold the pilot wheel in the guiding furrow.

In testimony whereof I affix my signature.

RALPH D. McALLISTER. [L. S.]